(12) United States Patent
Krueger et al.

(10) Patent No.: US 8,188,634 B2
(45) Date of Patent: May 29, 2012

(54) ELECTROSTATIC DRIVE, METHOD FOR OPERATING A MICROMECHANICAL COMPONENT HAVING AN ELECTROSTATIC DRIVE, AND METHOD FOR MANUFACTURING AN ELECTROSTATIC DRIVE

(75) Inventors: Michael Krueger, Reutlingen (DE); Frederic Njikam Njimonzie, Reutlingen (DE); Joerg Muchow, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 12/698,806

(22) Filed: Feb. 2, 2010

(65) Prior Publication Data

US 2010/0201292 A1 Aug. 12, 2010

(30) Foreign Application Priority Data

Feb. 4, 2009 (DE) .......................... 10 2009 000 599

(51) Int. Cl.
*H02N 1/00* (2006.01)
(52) U.S. Cl. ........................................................ 310/309
(58) Field of Classification Search .................. 310/309
See application file for complete search history.

(56) References Cited

U.S. PATENT DOCUMENTS 5,914,553 A * 6/1999 Adams et al. ................. 310/309
2002/0158548 A1* 10/2002 Min et al. ....................... 310/309
2003/0178912 A1* 9/2003 Norimatsu ..................... 310/309
2005/0035682 A1 2/2005 Tsuboi et al.
2005/0179338 A1* 8/2005 Tamura .......................... 310/309
2006/0071578 A1* 4/2006 Drabe et al. ................... 310/309
2006/0082251 A1* 4/2006 He et al. ......................... 310/309
2007/0222334 A1* 9/2007 Wan ............................... 310/309
2008/0106169 A1* 5/2008 Nagara .......................... 310/309
2008/0265710 A1* 10/2008 Ikehashi et al. ............... 310/309
2009/0260960 A1* 10/2009 Gritters et al. ................ 200/181

* cited by examiner

*Primary Examiner* — Thanh Iam
(74) *Attorney, Agent, or Firm* — Kenyon & Kenyon LLP (57) ABSTRACT

An electrostatic drive having at least three intermediate frames, each two adjacent intermediate frames being connected to one another via at least one intermediate spring whose longitudinal directions lie on a first axis of rotation, and intermediate electrode fingers being situated on frame girders oriented parallel to the first axis of rotation of the intermediate frames, and having an outer frame that surrounds the intermediate frames and that is connected to the outermost intermediate frame via at least one outer spring whose longitudinal direction lies on a second axis of rotation that is oriented non-parallel to the first axis of rotation, and outer electrode fingers being situated on frame girders oriented parallel to the second axis of rotation of the outer frame and of the outermost intermediate frame of the at least three intermediate frames. In addition, a micromechanical component having this electrostatic drive, a method for operating such a micromechanical component, and methods for manufacturing the electrostatic drive and the micromechanical component are described.

11 Claims, 9 Drawing Sheets

ELECTROSTATIC DRIVE, METHOD FOR OPERATING A MICROMECHANICAL COMPONENT HAVING AN ELECTROSTATIC DRIVE, AND METHOD FOR MANUFACTURING AN ELECTROSTATIC DRIVE

CROSS REFERENCE

The present application claims the benefit under 35 U.S.C. §119 of German Patent Application No. 102009000599.4 filed on Feb. 4, 2009, which is expressly incorporated herein in its entirety.

FIELD OF THE INVENTION

The present invention relates to a micromechanical drive and to a micromechanical component having an electrostatic drive. In addition, the present invention relates to a method for operating a micromechanical component having an electrostatic drive, and methods for manufacturing a corresponding electrostatic drive and such a micromechanical component.

BACKGROUND INFORMATION

A micromechanical component frequently includes an electrostatic drive having electrode fingers for displacing a displaceable element about an axis of rotation. A torque exerted on the displaceable element can be increased by situating the electrode fingers of the electrostatic drive at a greater distance from the axis of rotation. By increasing the distance, the voltage applied to the electrode fingers in order to displace the displaceable element can thus be reduced.

U.S. Publication No. 2005/0035682 A1 describes an electrostatic drive with which a mirror element is to be displaced about an axis of rotation. The electrostatic drive includes two frames whose girders oriented perpendicular to the axis of rotation have cross-braces/fastening webs that run parallel to the axis of rotation. The electrode fingers situated on the cross-braces/fastening webs extend away from the axis of rotation. The inner of the two frames is capable of being displaced by a first individual angle of displacement relative to the outer frame by applying a voltage to the electrode fingers situated between the two frames. In addition, the mirror element is capable of being rotated relative to the inner frame about the axis of rotation by a second individual angle of displacement by applying a further voltage to further electrode fingers that are situated between the mirror element and the inner frame. This ensures a summing of the two individual angles of displacement to form an overall angle of displacement by which the mirror element is capable of being displaced relative to the outer of the two frames.

However, the electrostatic drive described in U.S. Publication No. 2005/0035682 A1 has a relatively large base surface. This makes it more difficult to situate the electrostatic drive in a micromechanical component having a small size. In addition, in the electrostatic drive described in U.S. Publication No. 2005/0035682 A1, the mirror element is capable of being displaced only about the one axis of rotation. However, it is frequently desirable for it to be possible to displace a displaceable element about two axes of rotation that are oriented perpendicular to one another.

SUMMARY

The present invention makes possible an electrostatic drive whose first intermediate frame is capable of being displaced relative to the outer frame about the first axis of rotation and about the second axis of rotation. The electrostatic drive thus has greater functional capacity compared to a generic conventional electrostatic drive.

It is to be noted that, in accordance with the present invention, the electrode fingers are attached not via cross-braces/fastening webs, but rather directly to the frame girders of a frame. This is based on the recognition that the ratio of the base surface of an electrostatic drive and the number of frames of the electrostatic drive is capable of being reduced by situating the electrode fingers directly on a girder of the frame that is oriented parallel to the associated axis of rotation of the electrode fingers. This ensures a significant reduction of the base surface relative to the number of frames of the electrostatic drive according to the present invention.

On the basis of the relatively small ratio of the base surface relative to the number of frames of the electrostatic drive, the number of frames can be increased. This cascading of the electrostatic drive enables a larger number of individual angles of displacement that can be executed and thus enables an increase in the overall angle of displacement of the first intermediate frame relative to the outer frame. Thus, an increased overall angle of displacement is realized even given comparatively small individual angles of displacement.

The direct situation of the electrode fingers additionally ensures a comparatively large distance between the electrode fingers and the associated axis of rotation. This significantly increases the torque that can be achieved and enables a reduction of the voltage required for the displacement of at least one frame.

Conventional electrostatic drive having fingers situated at a distance from the axis of rotation have the disadvantage that, given an angle of rotation that is comparatively small relative to their height, the electrode fingers already emerge from the counter-electrode fingers. This results in a significant reduction of the individual angle of displacement that can be achieved. In accordance with the present invention, the comparatively small individual angle of displacement that can be achieved is capable of being compensated by the larger number of intermediate frames.

In an advantageous specific embodiment, the at least two intermediate frames have contact elements that are fashioned for the application of a first voltage to the intermediate electrode fingers, and the at least two intermediate springs are fashioned such that the first intermediate frame is capable of being rotated relative to the outer frame about the first axis of rotation through application of the first voltage. Likewise, the outer frame and the outermost intermediate frame of the at least three intermediate frames may have further contact elements that are fashioned for the application of a second voltage to the outer electrode fingers, and the at least one outer spring may be fashioned such that the first intermediate frame is capable of rotation relative to the outer frame about the second axis of rotation through application of the second voltage. The increased functional capacity of the electrostatic drive is thus ensured with comparatively simple operation.

Preferably, the at least one intermediate spring that connects the first intermediate frame to the second intermediate frame has a first spring rigidity, and the at least one outer spring has a second spring rigidity, the second spring rigidity being greater than the first spring rigidity. The intermediate electrode fingers situated on the second intermediate frame have a smaller distance from the axis of rotation than do the electrode fingers situated on the outer frame. Through a greater second spring rigidity, the electrostatic drive can thus be given better stability, while at the same time a rotation of the first intermediate frame about the second axis of rotation is ensured at a relatively small applied voltage.

In addition, the at least one intermediate spring that connects the outermost intermediate frame of the at least three intermediate frames to the adjacent intermediate frames can have a third spring rigidity that is greater than the first spring rigidity. Preferably, the spring rigidity of the intermediate springs of the intermediate frames increases in linear fashion from the inside toward the outside. In this way, given application of a fixed value of the first voltage, a constant individual angle of displacement of the intermediate frames is ensured.

As an alternative, or in addition thereto, the intermediate electrode fingers situated on the first intermediate frame can have a first length, and the outer electrode fingers situated on the outer frame can have a second length, the second length being shorter than the first length. On the outer frame, due to its longer girders, more electrode fingers can be situated than on the first intermediate frame. Thus, the outer electrode fingers situated on the outer frame can be made shorter. Through the reduction of the second length relative to the first length, the base surface of the electrostatic drive can be additionally reduced. This simplifies the situation of the electrostatic drive in a micromechanical component.

In addition, the intermediate electrode fingers situated on the outermost intermediate frame of the at least three intermediate frames can have a third length that is shorter than the first length. In particular, the lengths of the intermediate electrode fingers can decrease continuously from the inside toward the outside. In this way, an additional reduction of the base surface of the electrostatic drive can be realized.

The advantages described above are also ensured in a micromechanical component having a corresponding electrostatic drive.

Advantageously, the displaceable element may be connected to the first intermediate frame via at least one inner spring having a longitudinal direction that lies on the second axis of rotation. In this way, the displaceability of the displaceable element is significantly improved in relation to the prior art.

In addition, the micromechanical component can have a voltage control device that is designed to apply to the intermediate electrode fingers, as a first voltage, a first voltage signal having a first frequency that is smaller by at least a factor of 2 than a natural frequency of an oscillatory movement of the displaceable element and of the at least three intermediate frames about the second axis of rotation relative to the outer frame, and to apply to the outer electrode fingers, as a second voltage, a second voltage signal having a second frequency that corresponds to the natural frequency of the oscillatory movement of the displaceable element and of the at least three intermediate frames about the second axis of rotation relative to the outer frame. The natural frequency of the oscillatory movement of the displaceable element and of the at least three intermediate frames results for example from the spring constant of the at least one spring via which the at least three intermediate frames are connected to the outer frame, and from the overall mass of the displaceable element, the at least three intermediate frames, the at least two intermediate springs, and the at least one inner spring.

Thus, the resonant excitation is excitation to a mode of oscillation in which the displaceable element as the first mass, and the at least three intermediate frames, and the at least two intermediate springs as the second mass, as well as the at least one inner spring and the at least one outer spring, represent a two-spring-two-mass system that oscillates about the resonant axis. Preferably, the displaceable element oscillates out of phase and with a larger amplitude relative to the at least three intermediate frames and the at least two intermediate springs.

The displaceable element is thus capable of being displaced about the first axis of rotation in a quasi-static operating mode and about the second axis of rotation in a resonant operating mode. In this way, a micromechanical component having a displaceable element is realized whose inner axis can be driven statically and whose outer axis can be driven in resonant fashion. Preferably, the inner axis is oriented orthogonally to the outer axis.

Here, in each case a cascading of the first axis of rotation, which can be designated the static axis, and the second axis of rotation, which can be designated the resonant axis, is ensured. The torque of the static axis is increased, for example given the same surface, by a factor of 100. In this way, it is possible to significantly reduce the voltage required for the displacement of the displaceable element. Because each of the intermediate frames forms a comparatively small inertial mass, each intermediate frame can be individually reset into its initial position. The return time of the static axis is thus not limited by a large moment of inertia.

Due to the large number of interleaved intermediate frames, during the displacement of the displaceable element about the static axis each of the intermediate frames is displaced by a partial displacement angle relative to the adjacent outer frame. Through the cascading of the static axis, even given application of a relatively small voltage to the intermediate electrode fingers and a comparatively small individual angle of displacement, a relatively large overall angle of displacement, for example of at least 7°, is reached, by which the first intermediate frame (chip surface) is capable of being displaced relative to the outer frame.

In the displacement of the displaceable element about the resonant axis, a significant increase in the angle of displacement is achieved. In this way, a significant increase of the tilt angle of the displaceable element about the resonant axis is achieved already at a comparatively small tilt angle of the outermost intermediate frame of the at least three intermediate frames relative to the outer frame. The micromechanical component described here thus unites the advantages of the quasi-static drive and the resonant drive.

Through the separation of the two axes, the at least two intermediate springs and the at least one outer spring can be optimized independently of each other. In addition, the voltages applied to the intermediate electrode fingers and to the outer electrode fingers can be supplied separately. The voltages are thus not summed at any location of the chip. Likewise, the moments of inertia of the frames can be optimized largely independently of each other. For example, given a lengthening of the inner spring the overall moment of inertia changes only linearly with the lengthening of the inner spring. Thus, the inner spring can be made longer comparatively easily, which ensures better distribution of the mechanical stresses that occur during bending of the inner spring.

The advantages described above of the exemplary micromechanical component are also provided in a method for operating a micromechanical component.

In addition, the advantages can be realized through methods for manufacturing a corresponding electrostatic drive or such a micromechanical component. For example, a voltage control device can be situated on the micromechanical component that fulfills the functions already named above.

BRIEF DESCRIPTION OF THE DRAWINGS

Further features and advantages of the present invention are explained below on the basis of the Figures.

DETAILED DESCRIPTION OF EXAMPLE EMBODIMENTS

Figure 1A:
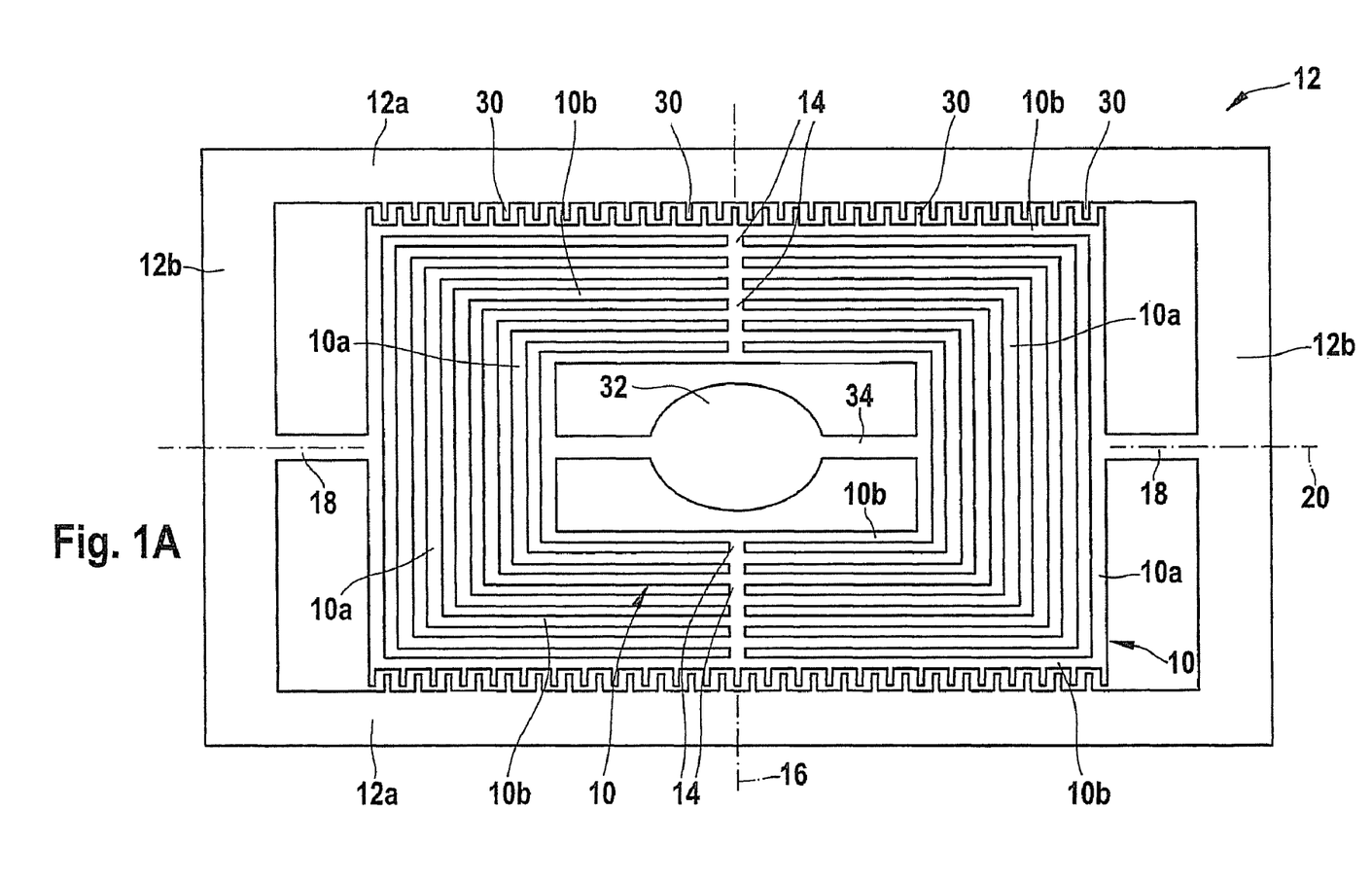
FIGS. 1A through C show an overall top view and two individual views representing a specific embodiment of the micromechanical component.
Figure 1B:
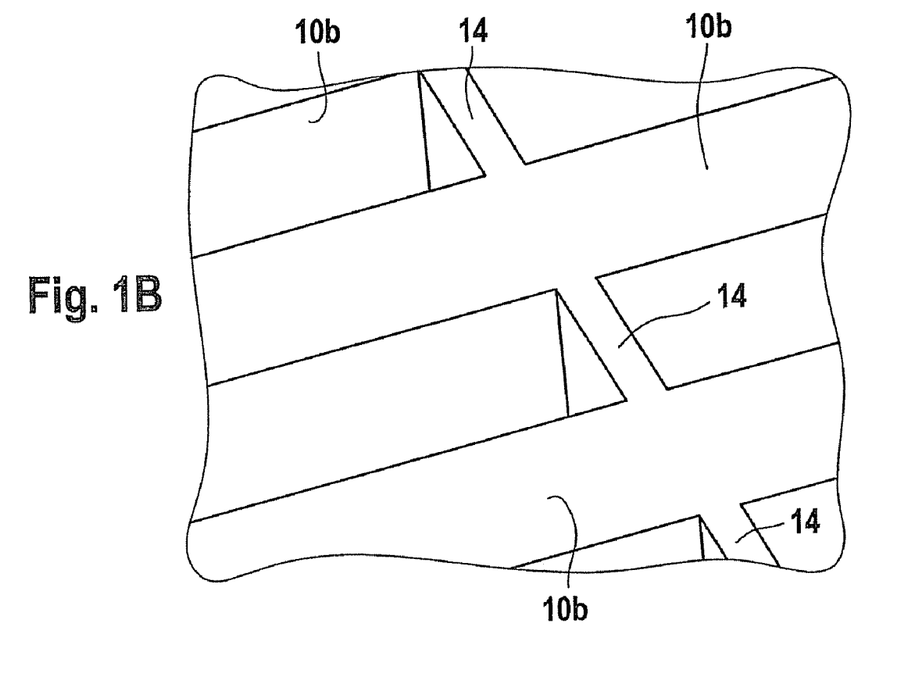
Figure 1C:
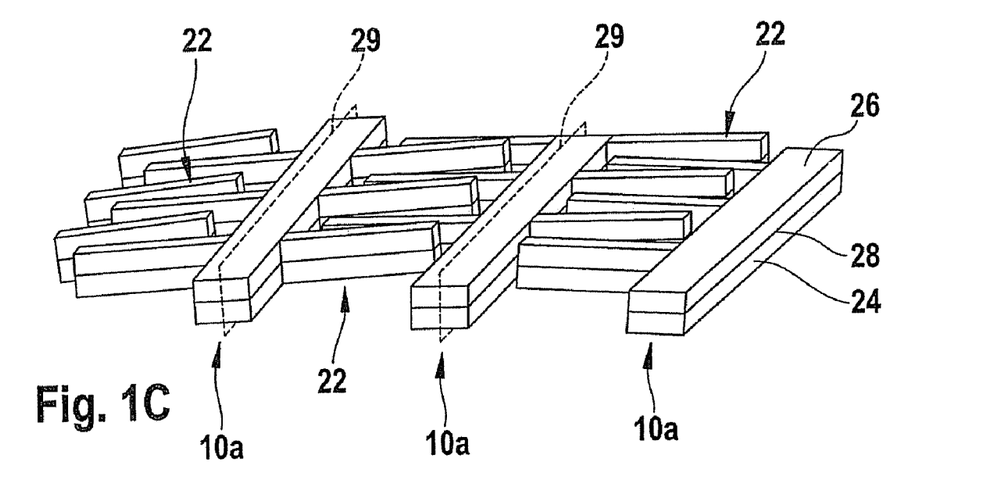

FIGS. 1A through C show an overall top view and two individual views representing a specific embodiment of the micromechanical component.

The micromechanical component shown schematically in FIG. 1A in an overall top view has an electrostatic drive having a plurality of intermediate frames 10 and an outer frame 12. The at least three intermediate frames 10 and outer frame 12 may be rectangular frames. However, the designations intermediate frames 10 and outer frame 12 do not limit frames 10 and 12 that are used to a rectangular shape. For example, frames 10 and 12 may also have curved segments.

Intermediate frames 10 are interleaved with one another in such a way that an innermost first intermediate frame 10 is surrounded by an adjacent second intermediate frame 10. First intermediate frame 10 and second intermediate frame 10 are surrounded by a third intermediate frame 10. The configuration of intermediate frames 10 may be continued in a corresponding manner. The electrostatic drive is not limited to the number of intermediate frames 10 shown in FIG. 1A.

Each two intermediate frames 10 situated adjacent to one another are connected to one another via at least one intermediate spring 14. For example, two intermediate springs 14 are fashioned between two adjacent intermediate frames 10. The longitudinal directions of intermediate springs 14 lie on a first axis of rotation 16.

FIG. 1B shows an enlargement of intermediate springs 14 of the micromechanical component of FIG. 1A. Intermediate springs 14 can have a constant spring rigidity. A further advantageous exemplary embodiment for non-constant spring rigidities of intermediate springs 14 is further discussed below.

Each of the intermediate frames 10 has two girders 10a situated parallel to first axis of rotation 16 and two girders 10b oriented perpendicular to first axis of rotation 16. Each of the intermediate springs 14 runs from a girder 10b oriented perpendicular to first axis of rotation 16 to an adjacent girder 10b that is also situated perpendicular to first axis of rotation 16.

Outer frame 12 surrounds intermediate frames 10. The outer frame is connected to outermost intermediate frame 10 via at least one outer spring 18. For example, two outer springs 18 are fashioned between outer frame 12 and outermost intermediate frame 10. The longitudinal direction of the at least one outer spring 18 lies on a second axis of rotation 20 that is oriented perpendicular to first axis of rotation 16.

Outer frame 12 has two girders 12a that are situated parallel to second axis of rotation 20 and two girders 12b that are oriented perpendicular to second axis of rotation 20. The at least one outer spring 18 runs from a girder 12b, oriented perpendicular to second axis of rotation 20, of outer frame 12 to a girder 10a, situated parallel to first axis of rotation 16, of outermost intermediate frame 10.

On girder 10a, situated parallel to first axis of rotation 16, of intermediate frame 10, there are situated intermediate electrode fingers 22 (see FIG. 1C), which however are not shown in FIG. A. Preferably, intermediate electrode fingers 22 are situated on the side surfaces of girders 10a, which are oriented toward an adjacent girder 10a. The intermediate electrode fingers act as electrodes and counter-electrodes. For this purpose, intermediate frames 10 have contact elements (not shown) that are fashioned for the application of a first voltage to intermediate electrode fingers 22. In particular, the contact elements can be fashioned such that at least one first potential can be applied to intermediate electrode fingers 22 on a first side of first axis of rotation 16, and at least one second potential, differing from the first potential, can be applied to intermediate electrode fingers 22 on a second side of first axis of rotation 16. A possible construction of frames 10 and 12 for the application of a voltage is described in more detail below. Intermediate springs 14 are fashioned such that through application of the first voltage between two adjacent intermediate frames 10, the inner of the two intermediate frames 10 is capable of being displaced relative to the outer of the two intermediate frames 10, about first axis of rotation 16.

Intermediate frames 10 can have the layer sequence shown in FIG. 1C of a lower conductive layer 24, an upper conductive layer 26, and an insulating layer 28 situated between the two conductive layers 24 and 26. In this way, each of the intermediate electrode fingers 22 has two conductive areas that are electrically insulated from one another, to which different voltages can be applied. Some possible advantages of such a construction of intermediate frames 10 are described in more detail below.

Intermediate frames 10, having the layer sequence shown in FIG. 1C of layers 24 through 28, can easily be manufactured by structuring intermediate frames 10, with intermediate springs 14 and electrode fingers 22, from a layer construction of layers 24, 26, and 28. The structuring out of components 10, 14, and 22 can be carried out using standard methods.

In addition, center intermediate frames 10 situated between first intermediate frame 10 and outermost intermediate frame 10 can be fashioned such that a potential can be applied to the lower conductive regions of layer 24 that are situated outwardly, going out from a separating plane 29, that differs from the potential applied to the lower conductive regions of layer 24 that are situated inwardly going out from separating plane 29. In addition, center intermediate frames 10 can be fashioned such that a potential can be applied to the upper conductive regions of layer 26 that are situated outwardly, going out from separating plane 29, that differs from the potential applied to the upper conductive regions of layer 26 that are situated inwardly, going out from separating plane 29. This can also be designated a division into four of a center intermediate frame 10, so that each center intermediate frame 10 has four conductive regions that are insulated from one another to which different voltages can be applied.

It is to be noted that the micromechanical component is not limited to the layer sequence of intermediate frames 10, shown in FIG. 1C, made up of layers 24 through 28. Instead, intermediate frames 10 can, in an OOP (out-of-plane) configuration of intermediate electrode fingers 22 instead of an in-plane configuration, also be etched out of a single semiconductor and/or metallic layer, possibly having vertical separating layers made of an insulating material. Given an OOP configuration of intermediate frames 10, instead of division into four a division into two of center intermediate frames 10 can be carried out, so that a potential can be applied to intermediate electrode fingers 22 situated outwardly going out from separating plane 29 that differs from the potential applied to the intermediate electrode fingers situated inwardly going out from separating plane 29.

Outer electrode fingers 30 are situated on the inner side surfaces of frame girders 12a, situated parallel to second axis of rotation 20, of outer frame 12. Further outer electrode fingers 30, which act as counter-electrodes to outer electrode fingers 30 of outer frame 12, are fashioned on the outer side surface of the frame girders, oriented perpendicular to first axis of rotation 16, of outermost intermediate frame 10.

Because electrode fingers 22 and 30 are fastened directly to a complete frame 10, the electrostatic drive has good stability. In addition, the modes of oscillation of the electrostatic drive are situated in rotationally symmetrical fashion about axes of rotation 16 and 20.

Outer frame 12 can also have the layer sequence shown in FIG. 1C made up of layers 24 through 28. Likewise, given an OOP configuration, outer frame 12, with outer electrode fingers 30 and outer springs 18, can be structured out from a single semiconductor and/or metallic layer, possibly having vertical separating layers made of an insulating material.

Preferably, outer frame 12 is manufactured simultaneously with intermediate frames 10 in an etching method.

Outer frame 12 and outermost intermediate frame 10 have further contact elements that are fashioned for the application of a second voltage to outer electrode fingers 30. The at least one outer spring is fashioned in such a way that outermost intermediate frame 10 is displaced about second axis of rotation 20 relative to outer frame 12 through the application of the second voltage. Here, through the application of the second voltage to the outer electrode fingers, the other intermediate frames 10 are also rotated about second axis of rotation 20 relative to outer frame 12.

Preferably, the micromechanical component has a voltage control device (not shown) that is designed to simultaneously apply the first voltage between intermediate electrode fingers 22 of at least two intermediate frames 10 and the second voltage between outer electrode fingers 30. In this way, a displaceable element coupled to first intermediate frame 10 can simultaneously be displaced about the two axes of rotation 16 and 20.

The micromechanical component has, as displaceable element, a mirror element 32. Mirror element 32 is connected to first intermediate frame 10 via at least one inner spring 34. For example, two inner springs 34 are fashioned between first intermediate frame 10 and mirror element 32. However, it is to be noted that the schematically depicted micromechanical component is not limited to a displaceable element fashioned as mirror element 32.

In an advantageous operating mode of the micromechanical component, the voltage control device (not shown) is designed to apply the first voltage simultaneously to all intermediate electrode fingers 22 between two adjacent intermediate frames 10. In this way, each intermediate frame 10 surrounded by at least one other intermediate frame 10 is displaced relative to the externally adjacent intermediate frame 10 by an individual angle of displacement about first axis of rotation 16. First intermediate frame 10 is thus displaced relative to outermost intermediate frame 10 about first axis of rotation 16 by an overall angle of displacement that results as the sum of the individual angles of displacement. Due to the large number of intermediate frames, a relatively large overall angle of displacement can be achieved for a displacement of the displaceable element about first axis of rotation 16 even given a comparatively small individual angle of displacement. At the same time, the displaceable element can also be displaced about second axis of rotation 20 by application of the second voltage between outer electrode fingers 30.

In the following, an advantageous mode of operation of the voltage control device for applying the first and the second voltage to intermediate electrode fingers 22 and outer electrode fingers 30 is described. The operating mode can be realized in a micromechanical component in which, as shown in FIG. 1A, the longitudinal direction of the at least one inner spring 34 lies on second axis of rotation 20. Mirror element 32 can thus be displaced relative to first intermediate frame 10, with bending of the at least one inner spring 34, in an oscillatory movement about second axis of rotation 20. Mirror element 32 is tilted, by an angle referred to hereinafter as the tilt angle, relative to first intermediate frame 10 about second axis of rotation 20 by bending the at least one inner spring 34.

A preferred oscillatory movement of mirror element 32 and of intermediate frame 10 about second axis of rotation 20 has a natural frequency which is designated hereinafter as the natural frequency of mirror element 32. This natural frequency of mirror element 32 results from the spring constant of the at least one outer spring and the overall mass of mirror element 32, intermediate frames 10, intermediate springs 14, and the at least one inner spring 34. The resonant excitation having the natural frequency of the mirror element is thus the excitation to an oscillatory mode in which mirror element 32, as first mass, and intermediate frames 10 and intermediate springs 14 as second mass, as well as the at least one inner spring 34 and the at least one outer spring 18, form a two-spring-two-mass system. Preferably, the first mass oscillates out of phase and with a larger amplitude relative to the second mass.

During the operating mode, the voltage control device is designed to apply a first voltage signal as first voltage to the intermediate electrode fingers, said signal having a first frequency that differs significantly from the natural frequency of mirror element 32. For example, the first frequency is smaller by at least a factor of two than the natural frequency of mirror element 32. Likewise, the voltage control device is designed so that during the operating mode it applies a second voltage signal as second voltage to outer electrode fingers 30, said second signal having a second frequency that corresponds to the natural frequency of mirror element 32.

The displacement of mirror element 32 about first axis of rotation 16 thus takes place in quasi-static mode. In a conventional drive, the quasi-static mode is associated with the disadvantage that an actuator frame is capable of being displaced only by a comparatively small angle relative to an associated stator frame. However, in the micromechanical component shown in FIGS. 1A through 1C the disadvantage found in conventional devices of the quasi-static mode is removed in that the first voltage is applied between a large number of intermediate frames 10. In this way, from the large number of individual angles of displacement there results a relatively large overall angle of displacement by which mirror element 32, in the quasi-static mode, is capable of being displaced about first axis of rotation 16.

The displacement of mirror element 32 about second axis of rotation 20 takes place in the resonant operating mode. Through the application of the second voltage signal having the second frequency, which corresponds to the natural frequency of mirror element 32, mirror element 32 is excited in resonant fashion to oscillatory movement about the second axis of rotation. The energy supplied to the electrostatic drive via the application of the second voltage is in this way converted specifically for the oscillatory movement of mirror element 32 with bending of the at least one inner spring 34. In this way, it is possible to significantly increase the tilt angle of mirror element 32 compared to an angle of displacement by which outermost intermediate frame 10 is displaced about second axis of rotation 20 relative to external frame 12.

The advantageous operating mode described above can also be realized in the development of the electrostatic drive described in the following. However, the development of the electrostatic drive is not limited to the advantageous operating mode.

In the development of the electrostatic drive, an intermediate spring 14 that connects first intermediate frame 10 to second intermediate frame 10 has a first spring rigidity that is less than a second spring rigidity of the at least one outer spring 18. The distance from outer electrode fingers 30, situated on outer frame 12, to the second axis of rotation is significantly larger than the distance from intermediate electrode fingers 22 on the first inner frame to first axis of rotation 16. In this way, the stability of the electrostatic drive can be improved by a higher second spring rigidity of the at least one outer spring 18, a good displaceability of first intermediate frame 10 relative to second intermediate frame 10 being simultaneously ensured.

Likewise, in an electrostatic drive having at least three intermediate frames 10, an intermediate spring 14 that connects outermost intermediate frame 10 to inner adjacent intermediate frame 10 can have a third spring rigidity that is greater than the first spring rigidity. In particular, the spring rigidities of intermediate springs 14 can decrease continuously going from first intermediate frame 10 out to outermost intermediate frame 10. The electrode fingers situated on an intermediate frame 10 have, given a higher numbering of intermediate frame 10, a greater distance from first axis of rotation 16. The increase in the bending rigidity of intermediate springs 14 ensures that, for a particular value of the applied first voltage, each of the inner intermediate frames 10 rotates by the same individual angle of displacement relative to the outer adjacent intermediate frame 10.

In addition, intermediate electrode fingers 22 fastened to outermost intermediate frame 10 can have a second length that is less than a first length of intermediate electrode fingers 22 fastened to innermost first intermediate frame 10. On outermost intermediate frame 10, due to its longer frame girders 10a, more intermediate electrode fingers 22 can be situated than can be situated on frame girders 10a of first intermediate frame 10. Correspondingly, the length of intermediate electrode fingers 22 can decrease continuously from first intermediate frame 10 up to outermost intermediate frame 10. Through the reduction of the second length relative to the first length, the base surface of the electrostatic drive having frames 10 and 12 can be reduced. This simplifies the situation of the electrostatic drive in the micromechanical component.

FIGS. 2A through D show cross-sections representing a first specific embodiment of an example method for operating the micromechanical component. The method can be designated, for example, switch-electrode actuation.

The example method described in the following can be realized for example using the micromechanical component of FIGS. 1A through C, in which intermediate electrode fingers 22a and 22b and the outer electrode fingers (not shown) lie in a common plane (in-plane configuration). Intermediate electrode fingers 22a and 22b and the outer electrode fingers have the layer sequence described above of a lower conductive layer, an upper conductive layer, and an insulating layer situated between them.

For clarity, only first intermediate electrode fingers 22a, situated between the first intermediate frame and the second intermediate frame, of the first intermediate frame, and second intermediate electrode fingers 22b of the second intermediate frame are shown in the cross-sections of FIGS. 2A through D. Intermediate electrode fingers 22a and 22b situated on a first side 50 of the first axis of rotation are shown separately from intermediate electrode fingers 22a and 22b situated on a second side 52 of the first axis of rotation. Each of the first intermediate electrode fingers 22a has a first conductive region 22a-1 and a second conductive region 22a-2. Due to the insulating layer (not shown) situated between these regions, different potentials can be applied to conductive regions 22a-1 and 22a-2. Correspondingly, each of second intermediate electrode fingers 22b also has a first conductive area 22b-1 and a second conductive area 22b-2.

Preferably, in the example method, the application of the first voltage takes place in the quasi-static operating mode and the application of the second voltage takes place in the resonant operating mode, as explained above as a particularly advantageous operating mode. Although in FIGS. 2A through D only first and second intermediate electrode fingers 22a and 22b are shown, thus, the procedure for the simultaneous controlling of all electrode fingers is thereby sufficiently specified.

Figure 2A:
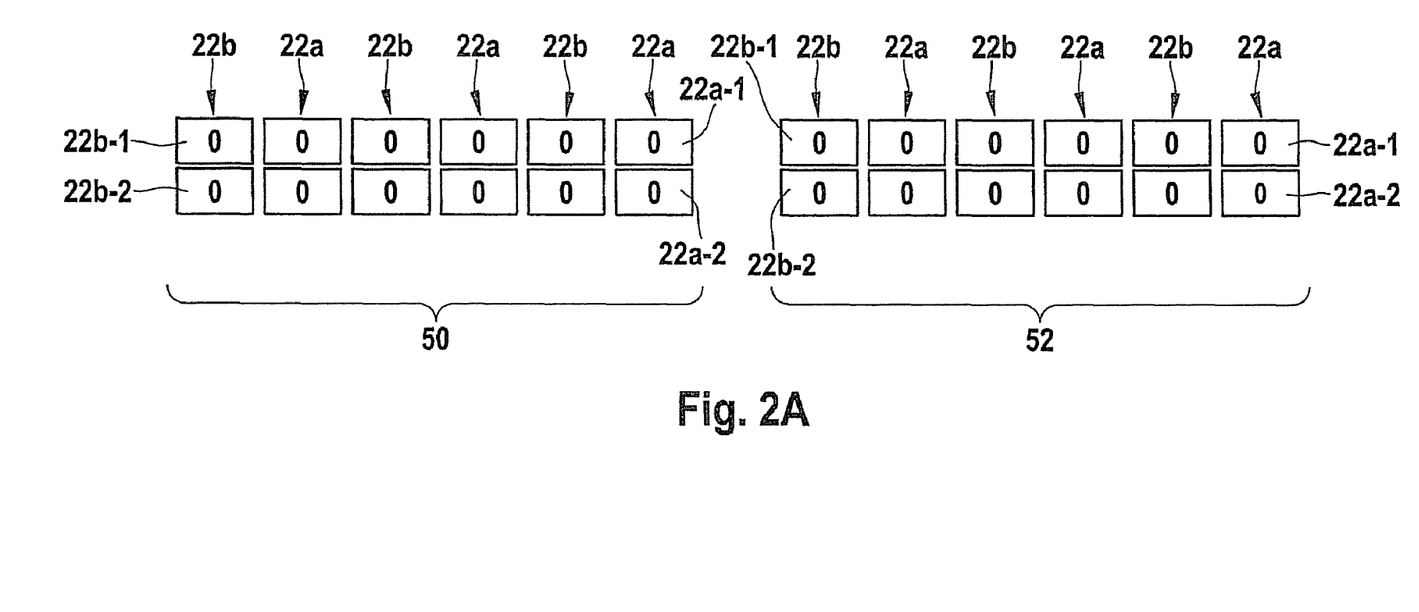
FIGS. 2A through D show cross-sections representing a first specific embodiment of the method for operating the micromechanical component.

Before the method described below, the same potential, for example 0, is adjacent to conductive regions 22a-1, 22a-2, 22b-1, and 22b-2 (see FIG. 2A). Thus, no voltages that are not equal to 0V are present between electrode fingers 22a and 22b. Thus, intermediate electrode fingers 22a and 22b are situated at the same level at both sides 50 and 52 of the first axis of rotation.

Figure 2B:
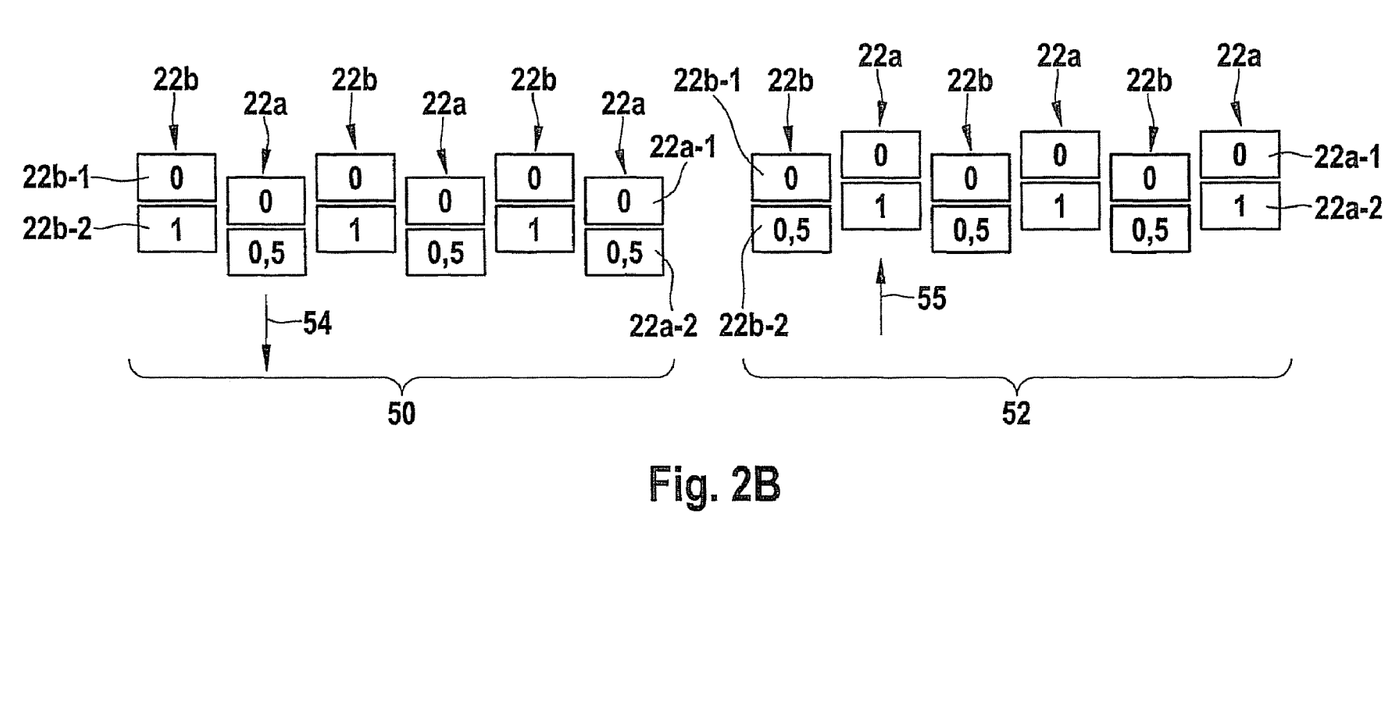

Via the method step shown in FIG. 2B, the first intermediate frame is moved forward relative to the second intermediate frame, in a direction of rotation. For this purpose, first intermediate electrode fingers 22a on first side 50 are moved forward in a first direction of excursion 54 and first intermediate electrode fingers 22a situated on second side 52 are moved forward in a second direction of excursion 55 that is oriented opposite first direction of excursion 54.

In order to determine the desired rotational movement of the first intermediate frame relative to the second intermediate frame, an equal first potential, for example zero, is applied on both sides to the conductive regions 22a-1 and 22b-1 situated in the second direction of excursion 55 relative to the insulating layer. Various potentials differing from the first potential are applied to conductive regions 22a-2 and 22b-2 situated in first direction of excursion 54 from the insulating layer. In the depicted specific embodiment, on first side 50 a second potential is applied to conductive regions 22a-2 of the first intermediate frame, and a third potential, which differs more strongly from the first potential than does the second potential, is applied to conductive regions 22b-2 of the second intermediate frame. For example, the second potential is a mean value between the first potential and the third potential. On second side 52, in contrast, the second potential is applied to conductive regions 22b-2 of the second intermediate frame and third potential 50 is applied to conductive regions 22a-2 of the first intermediate frame.

In the method step of FIG. 2B, a preferred direction for the rotational movement of the first intermediate frame relative to the second intermediate frame is thus specified via an intermediate potential, which is for example between zero and the maximum applied potential.

For a further displacement of the first intermediate frame in the direction of rotation determined in the method step of FIG. 2B, the difference in potential between the second and third potential is increased. For example, here the second potential is brought closer to the first potential (see FIG. 2C). In addition, the difference in potential between the first and the third potential can also be increased. This causes an increase in the individual angle of displacement between the first and the second intermediate frame.

Figure 2C:
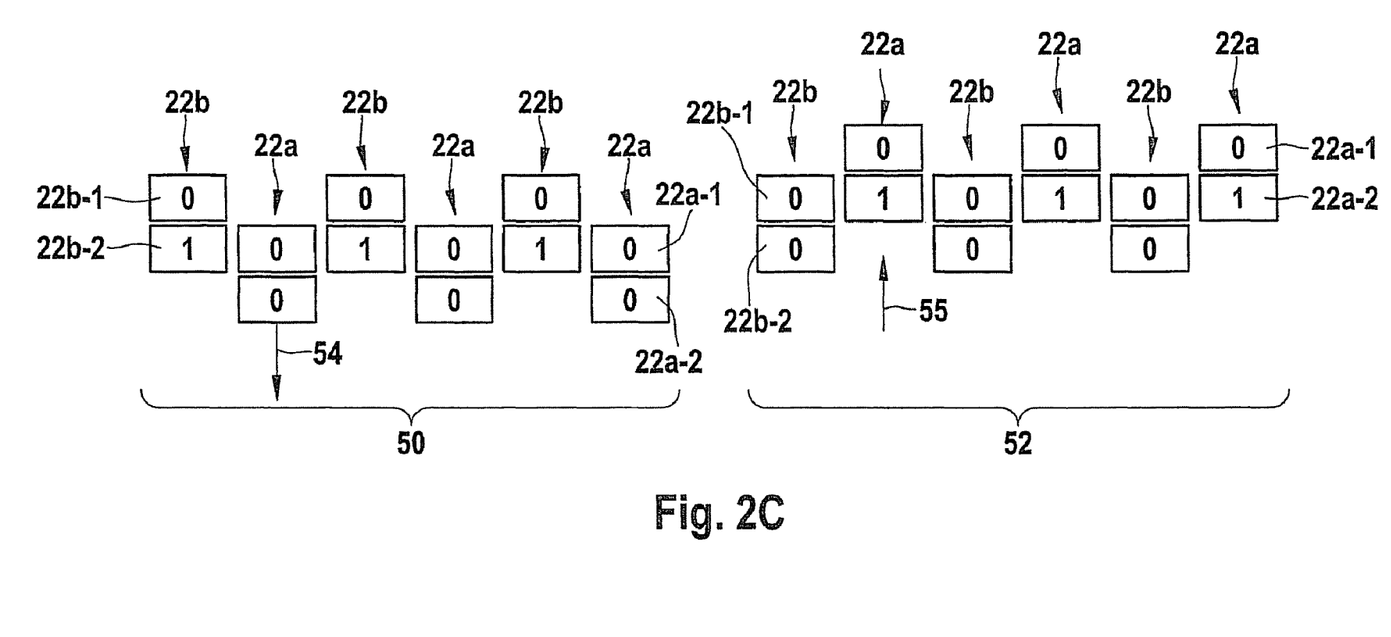
Figure 2D:
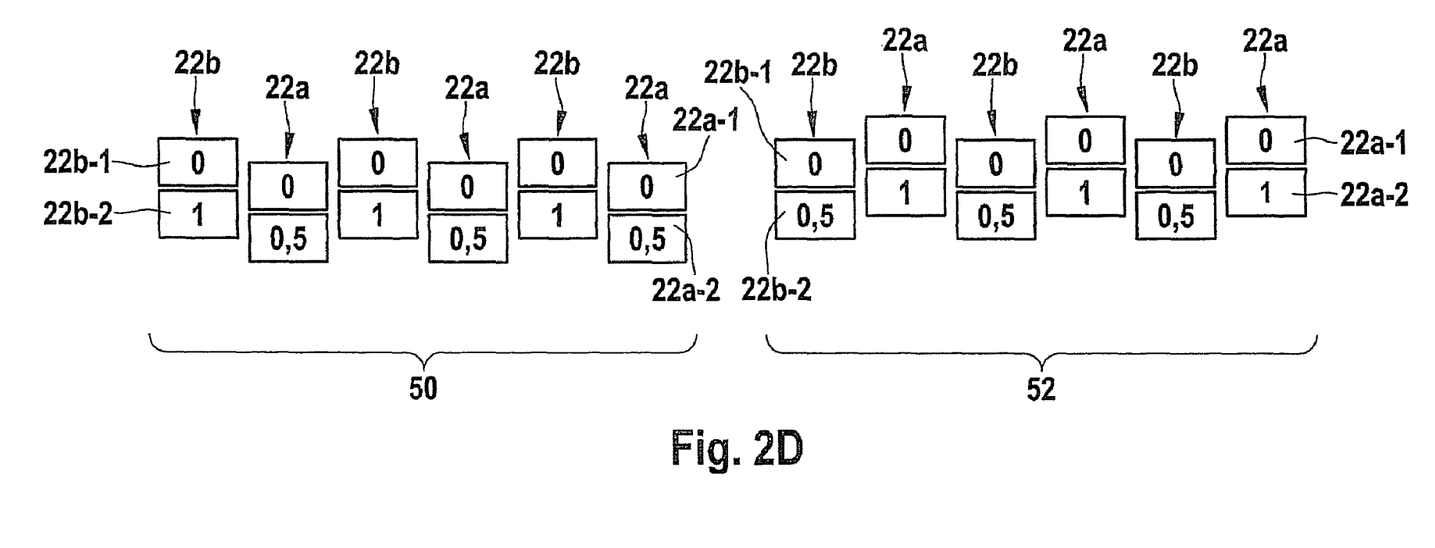

FIG. 2D shows a method step for rotating back the first intermediate frame. For example, an intermediate potential between the first and the third potential is reapplied, as a second potential, to conductive regions 22a-2, situated on first side 50, of the first intermediate frame and to conductive regions 22b-2, situated on second side 52, of the second intermediate frame.

On the basis of FIGS. 2B through D, an application of potentials for the displacement of the first intermediate frame relative to the second intermediate frame in a counter-direction of rotation is also disclosed for someone skilled in the art. Additionally, the first potential can also be applied to conductive regions 22a-2 and 22b-2, and correspondingly modified second and third potentials can be applied to conductive regions 22a-1 and 22b-1.

In order to execute the method of FIGS. 2A through D, four potentials, one ground, and five terminals are used. As is shown in FIGS. 2A through D, a construction of the intermediate frames having a layer sequence of two conductive layers and one insulating layer has the advantage that the first voltage, applied on both sides 50 and 52 of the first axis of rotation, contributes to the rotating out of the first intermediate frame. Thus, via an application on both sides of the first voltage a larger torque can be realized for the displacement of the first intermediate frame, in comparison with a voltage applied on only one side of the first axis of rotation. This advantage also occurs in operation of the further inner frames and of the outer frame.

Figure 3A:
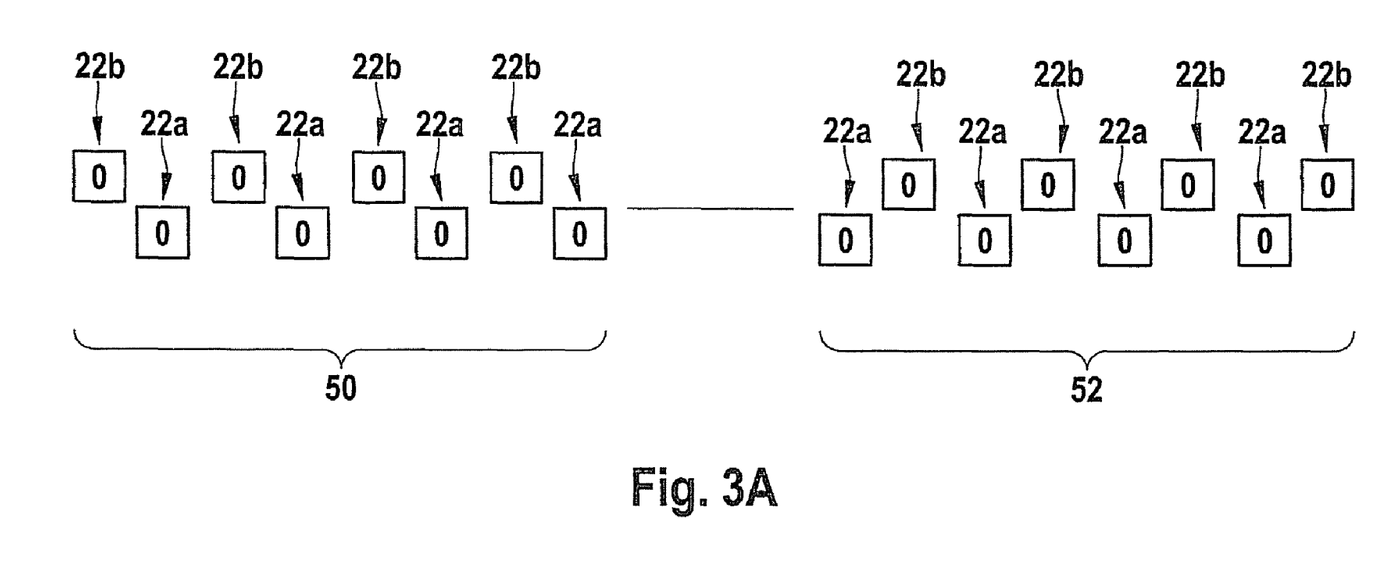
FIGS. 3A through C show cross-sections representing a second specific embodiment of the method for operating the micromechanical component.
Figure 3B:
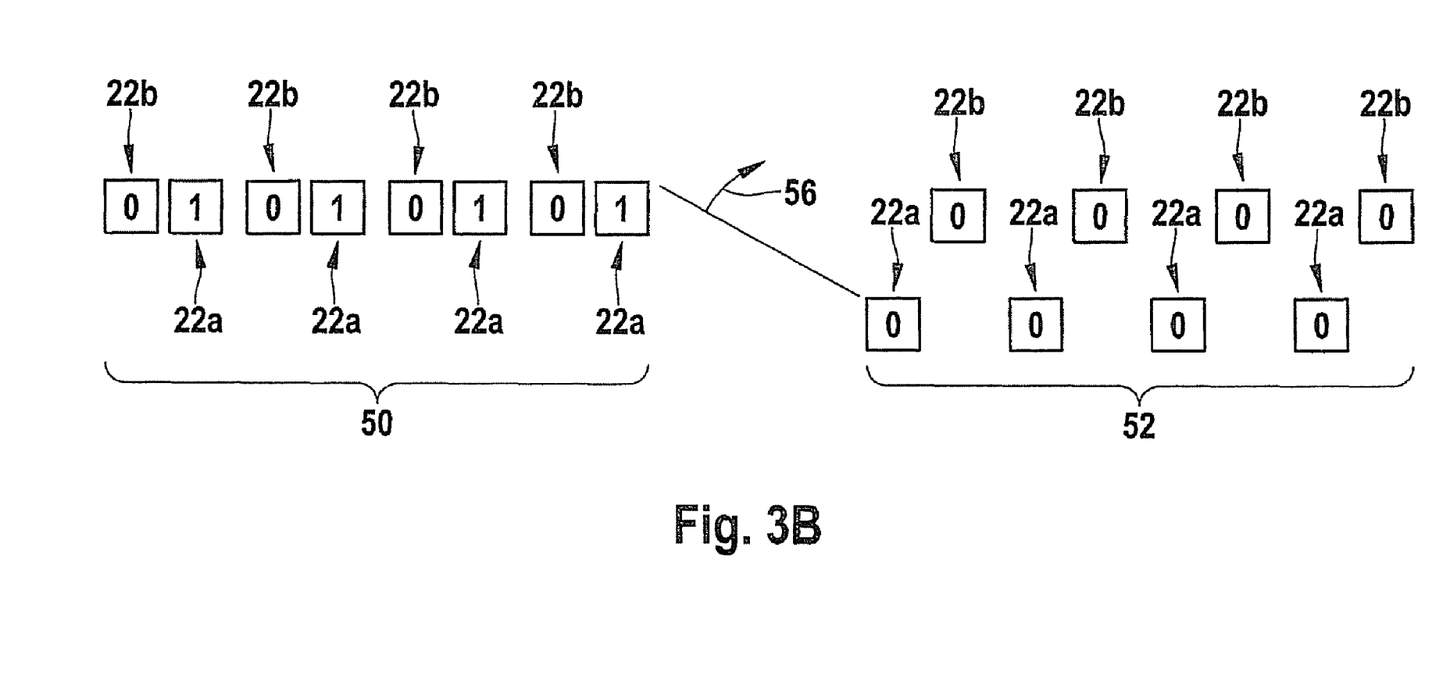
Figure 3C:
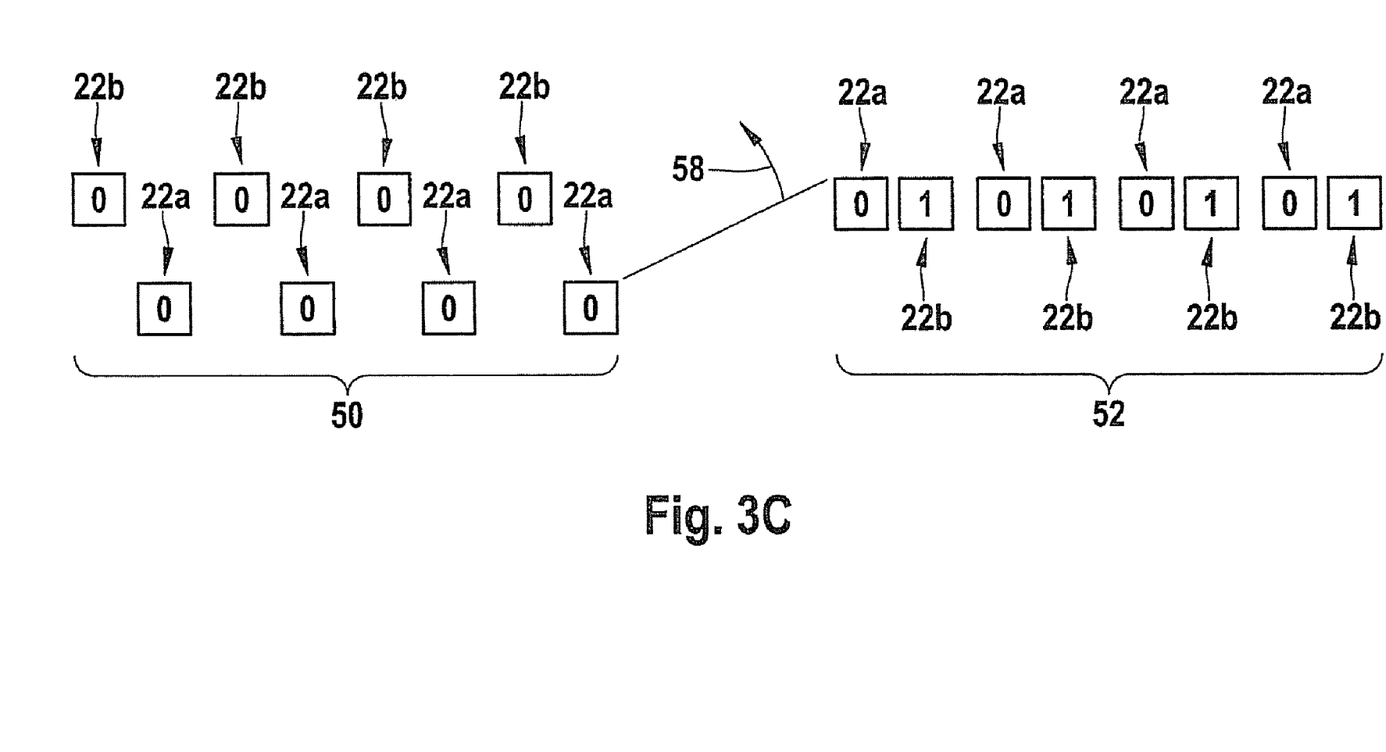

FIGS. 3A through C show cross-sections representing a second specific embodiment of the method for operating a micromechanical component.

The example method can be carried out in an electrostatic drive whose stator electrode fingers and actuator electrode fingers are configured in an out-of-plane (OOP) configuration. Thus, first intermediate electrode fingers 22a, acting as actuator electrode fingers and shown in cross-section, of the first intermediate frame are situated, in their no-voltage initial position, at least partly outside a volume that is spanned by second intermediate electrode fingers 22b, acting as stator electrode fingers, of the second intermediate frame. In order to carry out the method, no subdivision of intermediate electrode fingers 22a or 22b into two separate conductive regions is necessary.

If no voltage not equal to 0V is present between first intermediate electrode fingers 22a and second intermediate electrode fingers 22b, intermediate electrode fingers 22a are situated so that their height is offset relative to intermediate electrode fingers 22b (see FIG. 3A). In this position of first intermediate electrode fingers 22a relative to second intermediate electrode fingers 22b, the first intermediate frame is oriented parallel to the second intermediate frames.

If on first side 50 a first voltage not equal to 0V is applied between first intermediate electrode fingers 22a and second intermediate electrode fingers 22b, intermediate electrode fingers 22a and 22b on first side 50 are drawn into one another (see FIG. 3B). In this way, there takes place a rotational movement of the first intermediate frame about the first axis of rotation in first direction of rotation 56.

As is shown in FIG. 3C, the application of the first voltage not equal to 0V between first intermediate electrode fingers 22a and second intermediate electrode fingers 22b on second side 52 causes a drawing into one another of intermediate electrode fingers 22a and 22b on second side 52 and a moving apart from each other of intermediate electrode fingers 22a and 22b on first side 50. Thus, the application of the first voltage not equal to 0V to intermediate electrode fingers 22a and 22b on second side 52 of the first axis of rotation results in a rotational movement of the first intermediate frame in a second direction of rotation 58 that is oriented opposite to first direction of rotation 56.

In the example method of FIGS. 3A through C, the application of a voltage not equal to 0V between intermediate electrode fingers 22a and 22b thus makes sense only on one side 50 or 52 of the first axis of rotation. In order to execute the method, a ground terminal is used. Thus, a total of three terminals are required.

What is claimed is:

1. An electrostatic drive, comprising:
    at least three intermediate frames including at least one first intermediate frame, a second intermediate frame that surrounds the first intermediate frame, and a third intermediate frame that surrounds the first intermediate frame and the second intermediate frame;
    at least two intermediate springs, each two adjacent intermediate frames of the at least three intermediate frames being connected to one another via at least one of the intermediate springs, the at least two intermediate springs being situated such that longitudinal directions of the intermediate springs lie on a first axis of rotation;
    intermediate electrode fingers situated on frame girders, the frame girders being oriented parallel to a first axis of rotation of the at least three intermediate frames;
    an outer frame that surrounds the at least three intermediate frames and that is connected via at least one outer spring to an outermost intermediate frame of the at least three intermediate frames, the at least one outer spring being situated such that a longitudinal direction of the at least one outer spring lies on a second axis of rotation that is oriented non-parallel to the first axis of rotation, and outer electrode fingers of the outer frame and of the outermost intermediate frame situated on frame girders oriented parallel to the second axis of rotation.

2. The electrostatic drive as recited in claim 1, wherein the at least three intermediate frames have contact elements that are fashioned for an application of a first voltage to the intermediate electrode fingers, and the at least two intermediate springs are fashioned such that the first intermediate frame is capable of rotation relative to the outer frame about the first axis of rotation through the application of the first voltage, and the outer frame and the outermost intermediate frame of the at least three intermediate frames have further contact elements that are fashioned for an application of a second voltage to the outer electrode fingers, and the at least one outer spring being fashioned such that the first intermediate frame is capable of rotation about the second axis of rotation relative to the outer frame through the application of the second voltage.

3. The electrostatic drive as recited in claim 1, wherein the at least one intermediate spring that connects the first intermediate frame to the second intermediate frame has a first spring rigidity, and the at least one outer spring has a second spring rigidity, the second spring rigidity being greater than the first spring rigidity.

4. The electrostatic drive as recited in claim 1, wherein the intermediate electrode fingers situated on the first intermediate frame have a first length, and the outer electrode fingers situated on the outer frame have a second length, the second length being smaller than the first length.

5. A micromechanical component, comprising:
    an electrostatic drive, the electrostatic drive including:
        at least three intermediate frames including at least one first intermediate frame, a second intermediate frame that surrounds the first intermediate frame, and a third intermediate frame that surrounds the first intermediate frame and the second intermediate frame, at least two intermediate springs, each two adjacent intermediate frames of the at least three intermediate frames being connected to one another via at least one of the intermediate springs, the at least two intermediate springs being situated such that longitudinal directions of the intermediate springs lie on a first axis of rotation, intermediate electrode fingers situated on frame girders, the frame girders being oriented parallel to a first axis of rotation of the at least three intermediate frames, and an outer frame that surrounds the at least three intermediate frames and that is connected via at least one outer spring to an outermost intermediate frame of the at least three intermediate frames, the at least one outer spring being situated such that a longitudinal direction of the at least one outer spring lies on a second axis of rotation that is oriented non-parallel to the first axis of rotation, and outer electrode fingers of the outer frame and of the outermost intermediate frame situated on frame girders oriented parallel to the second axis of rotation; and a displaceable element connected to the electrostatic drive such that the displaceable element is capable of rotation about the first axis of rotation through application of a first voltage between the intermediate electrode fingers, and the displaceable element is capable of rotation about the second axis of rotation through application of a second voltage between the outer electrode fingers.

6. The micromechanical component as recited in claim 5, wherein the displaceable element is connected to the first intermediate frame via at least one inner spring having a longitudinal direction that lies on the second axis of rotation.

7. The micromechanical component as recited in claim 6, further comprising:

a voltage control device that is designed to apply, as the first voltage, a first voltage signal having a first frequency to the intermediate electrode fingers, said first frequency being smaller by at least a factor of two than a natural frequency of an oscillatory movement of the displaceable element and of the at least three intermediate frames relative to the outer frame about the second axis of rotation, and to apply to the outer electrode fingers, as the second voltage, a second voltage signal having a second frequency that corresponds to the natural frequency of the oscillatory movement of the displaceable element and of the at least three intermediate frames relative to the outer frame about the second axis of rotation.

8. A method for operating a micromechanical component having at least three intermediate frames including at least one first intermediate frame, a second intermediate frame that surrounds the first intermediate frame, and a third intermediate frame that surrounds the first intermediate frame and the second intermediate frame, each two adjacent intermediate frames of the micromechanical component further having at least two intermediate springs, the at least three intermediate frames being connected to one another via at least one of the intermediate springs, the at least two intermediate springs being situated such that longitudinal directions of the intermediate springs lie on a first axis of rotation, and intermediate electrode fingers being situated on frame girders, the frame girders being oriented parallel to the first axis of rotation, of the at least three intermediate frames, the micromechanical component further having an outer frame that surrounds the at least three intermediate frames and that is connected via at least one outer spring to an outermost intermediate frame of the at least three intermediate frames, the at least one outer spring being situated such that a longitudinal direction of the at least one outer spring lies on a second axis of rotation that is oriented non-parallel to the first axis of rotation, and outer electrode fingers situated on frame girders oriented parallel to the second axis of rotation of the outer frame and of the outermost intermediate frame of the at least three intermediate frames, and a displaceable element that is connected to the first intermediate frame via at least one inner spring that has a longitudinal direction that lies on the second axis of rotation, the method comprising:

displacing the displaceable element about the first axis of rotation through application to the intermediate electrode fingers of a first voltage signal having a first frequency that is smaller by at least a factor of two than a natural frequency of an oscillatory movement of the displaceable element and of the at least three intermediate frames about the second axis of rotation relative to the outer frame; and displacing the displaceable element about the second axis of rotation through application to the outer electrode fingers of a second voltage signal having a second frequency that corresponds to the natural frequency of the oscillatory movement of the displaceable element and of the at least three intermediate frames about the second axis of rotation relative to the outer frame.

9. A method for manufacturing an electrostatic drive having at least three intermediate frames, including a first intermediate frame, a second intermediate frame and at least a third intermediate frame, the method comprising:

situating the second intermediate frame around the first intermediate frame;

situating at least one third intermediate frame about the first intermediate frame and the second intermediate frame, each two adjacent intermediate frames of the at least three intermediate frames being connected to one another via at least one intermediate spring, the at least two intermediate springs being situated such that the longitudinal directions of the intermediate springs lie on a first axis of rotation, and intermediate electrode fingers being situated on frame girders, oriented parallel to the first axis of rotation, of the at least three intermediate frames; and situating an outer frame around the at least three intermediate frames, the outer frame being connected via at least one outer spring to an outermost intermediate frame of the at least three intermediate frames, the at least one outermost spring being situated such that a longitudinal direction of the at least one outermost spring lies on a second axis of rotation that is oriented non-parallel to the first axis of rotation, and outer electrode fingers being situated on frame girders oriented parallel to the second axis of rotation of the outer frame and of the outermost intermediate frame of the at least three intermediate frames.

10. The manufacturing method as recited in claim 9, wherein contact elements are situated on the at least three intermediate frames, the contact elements being fashioned for an application of a first voltage to the intermediate electrode fingers, and the at least two intermediate springs being fashioned such that the first intermediate frame of the at least three intermediate frames is rotated relative to the outer frame about the first axis of rotation upon an application of the first voltage, and further contact elements being situated on the outer frame and on the outermost intermediate frame of the at least three intermediate frames, said further contact elements being fashioned for an application of a second voltage to the outer electrode fingers, and the at least one outer spring being fashioned such that the first intermediate frame of the at least three intermediate frames is rotated relative to the outer frame about the second axis of rotation upon an application of the second voltage.

11. A method for manufacturing a micromechanical component, comprising:

forming an electrostatic drive, including,
  situating the second intermediate frame around the first intermediate frame,
    situating at least one third intermediate frame about the first intermediate frame and the second intermediate frame, each two adjacent intermediate frames of the at least three intermediate frames being connected to one another via at least one intermediate spring, the at least two intermediate springs being situated such that the longitudinal directions of the intermediate springs lie on a first axis of rotation, and intermediate electrode fingers being situated on frame girders, oriented parallel to the first axis of rotation, of the at least three intermediate frames, and
    situating an outer frame around the at least three intermediate frames, the outer frame being connected via at least one outer spring to an outermost intermediate frame of the at least three intermediate frames, the at least one outermost spring being situated such that a longitudinal direction of the at least one outermost spring lies on a second axis of rotation that is oriented non-parallel to the first axis of rotation, and outer electrode fingers being situated on frame girders oriented parallel to the second axis of rotation of the outer frame and of the outermost intermediate frame of the at least three intermediate frames,
  wherein contact elements are situated on the at least three intermediate frames, the contact elements being fashioned for an application of a first voltage to the intermediate electrode fingers, and the at least two intermediate springs being fashioned such that the first intermediate frame of the at least three intermediate frames is rotated relative to the outer frame about the first axis of rotation upon an application of the first voltage, and further contact elements being situated on the outer frame and on the outermost intermediate frame of the at least three intermediate frames, said further contact elements being fashioned for an application of a second voltage to the outer electrode fingers, and the at least one outer spring being fashioned such that the first intermediate frame of the at least three intermediate frames is rotated relative to the outer frame about the second axis of rotation upon an application of the second voltage; and forming a displaceable element that is connected to the electrostatic drive such that the displaceable element is rotated about the first axis of rotation upon application of the first voltage between the intermediate electrode fingers and is rotated about the second axis of rotation upon application of the second voltage between the outer electrode fingers.

\* \* \* \* \*